United States Patent [19]

Cooper et al.

[11] 4,373,045

[45] Feb. 8, 1983

[54] POLYPHENYLENE ETHER MOLDING COMPOSITIONS THAT INCLUDE AN ALKENYL AROMATIC RESIN, AN ETHYLENE PROPYLENE RUBBER AND A TRIARYL PHOSPHATE

[75] Inventors: Glenn D. Cooper, Delmar; Gim F. Lee, Jr., Albany, both of N.Y.

[73] Assignee: General Electric Company, Pittsfield, Mass.

[21] Appl. No.: 140,579

[22] Filed: Apr. 15, 1980

[51] Int. Cl.$^3$ .................. C08K 5/52; C08L 71/04
[52] U.S. Cl. .................... 524/141; 524/143; 525/68; 525/132; 525/152
[58] Field of Search ............ 260/45.7 P; 525/132, 525/68, 152; 524/141, 143

[56] References Cited

U.S. PATENT DOCUMENTS

| | | | |
|---|---|---|---|
| 2,021,887 | 11/1935 | Clarke et al. | 106/177 |
| 3,576,780 | 4/1971 | Jackson, Jr. | 260/45.7 P |
| 3,639,506 | 2/1972 | Haaf | 260/45.7 P |
| 3,660,531 | 5/1972 | Lauchlan et al. | 525/175 |
| 3,786,105 | 1/1974 | Nakashio et al. | 525/132 |
| 3,787,532 | 1/1974 | Carmelite et al. | 525/68 |
| 3,809,729 | 5/1974 | Reinhard | 260/45.7 P |
| 3,819,759 | 6/1974 | Weaver et al. | 260/45.7 P |
| 3,883,613 | 5/1975 | Cooper | 525/68 |
| 3,883,613 | 5/1975 | Cooper | 260/45.7 P |
| 3,943,191 | 3/1976 | Cooper et al. | 260/45.7 P |
| 4,038,343 | 7/1977 | Yonemitsu et al. | 260/45.7 P |
| 4,101,505 | 7/1978 | Cooper et al. | 260/42.18 |
| 4,128,602 | 12/1978 | Katchman et al. | 525/132 |

FOREIGN PATENT DOCUMENTS 165110  2/1975  Czechoslovakia .

*Primary Examiner*—John Kight, III
*Assistant Examiner*—R. A. White
*Attorney, Agent, or Firm*—Hedman, Casella, Gibson & Costigan

[57] ABSTRACT

This invention provides novel thermoplastic molding compositions of a polyphenylene ether resin, an EPR rubber, a triaryl phosphate or an EPDM modified alkenyl aromatic resin or a combination of a triaryl phosphite and an EPDM modified alkenyl aromatic resin.

19 Claims, No Drawings

POLYPHENYLENE ETHER MOLDING COMPOSITIONS THAT INCLUDE AN ALKENYL AROMATIC RESIN, AN ETHYLENE PROPYLENE RUBBER AND A TRIARYL PHOSPHATE

BACKGROUND OF THE INVENTION

The term "polyphenylene ether" resin is descriptive of a well known group of polymers that may be made by a variety of catalytic and non-catalytic processes. By way of exemplification, certain of the polyphenylene ethers are disclosed in Hay, U.S. Pat. Nos. 3,306,874 and 3,306,875, and in Stamatoff, U.S. Pat. No. 3,257,357 and U.S. Pat. No. 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ethers are set forth in Fox, U.S. Pat. No. 3,356,761; Sumitomo, U.K. Pat. No. 1,291,609; Bussink et al, U.S. Pat. No. 3,337,499, Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217 and disclosures relating to metal based catalysts which do not include amines are known from patents such as Wieden et al., U.S. Pat. No. 3,442,885 (copper-amidines); Nakashio et al, U.S. Pat. No. 3,573,257 (metal alcoholate or phenolate); Kobayashi et al, U.S. Pat. No. 3,455,880 (cobalt chelates); and the like. In the Stamatoff patents, the polyphenylene ethers are produced by reacting the corresponding phenolate ion with an initiator such as a peroxy acid salt, an acid peroxide, a hypohalite, and the like, in the presence of a complexing agent. Disclosures relating to noncatalytic processes, such as oxidation with lead dioxide, silver oxide etc. are described in U.S. Pat. No. 3,382,212. Cizek, U.S. Pat. No. 3,383,435 discloses compositions of polyphenylene ethers and styrene resins.

In Czechoslovakian patent 165,110 there are described compositions of a polyphenylene ether resin; polystyrene or high impact polystyrene; and either an ethylene-propylene copolymer, polyisobutylene or an α-olefin copolymer. U.S. Pat. No. 3,943,191; U.S. Pat. No. 4,101,503; U.S. Pat. No. 4,101,504; U.S. Pat. No. 4,101,505 and U.S. Pat. No. 4,102,850 all disclose compositions that include a polyphenylene ether resin and an alkenyl aromatic resin that is modified with an interpolymerized EPDM rubber. All of the above-mentioned patents are incorporated herein by reference.

The applicants have found that when a composition of a polyphenylene ether resin and a triaryl phosphate or a composition of a polyphenylene ether resin and an EPDM modified alkenyl aromatic resin is combined with an ethylene propylene rubber, there results a composition having increased notched Izod impact strength and increased Gardner impact strength.

The increased impact strength of the compositions of the invention is unexpected because ethylene-propylene rubber when combined with a polybutadiene modified high impact styrene resin, results in a composition having decreased impact properties.

Accordingly, it is a primary object of this invention to provide impact resistant compositions of polyphenylene ether resins.

DETAILED DESCRIPTION OF THE INVENTION

The compositions of the invention consist essentially of:
- (a) a polyphenylene ether resin;
- (b) an ethylene propylene rubber; and
- (c) a component selected from the group consisting of:
  - (i) a triaryl phosphate;
  - (ii) an EPDM modified alkenyl aromatic resin; and
  - (iii) a combination of (i) and (ii).

The polyphenylene ether resins are polymers having units of the formula:

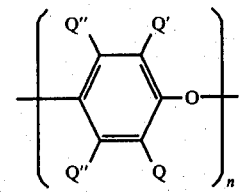

wherein Q is selected from the group consisting of hydrogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, Q' and Q'' are the same as Q and in addition halogen with the proviso that Q and Q' are both free of a tertiary carbon atom and n is an integer of at least 50.

The preferred polyphenylene ether resin is a poly(2,6-dimethyl-1,4-phenylene) ether resin having an intrinsic viscosity of from about 0.30 dl/g to about 0.65 dl/g as measured in chloroform at 30° C.

The EPDM alkenyl aromatic resin will have at least 25% of its units derived from monomers of the formula:

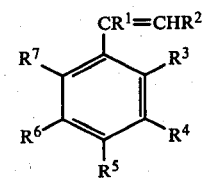

wherein $R^1$ and $R^2$ are selected from the group consisting of lower alkyl or alkenyl groups of from 1 to 6 carbon atoms and hydrogen; $R^3$, $R^4$ and $R^5$ are selected from the group consisting of chloro, bromo, hydrogen and (lower) alkyl of from 1 to 6 carbon atoms; $R^6$ and $R^7$ are selected from the group consisting of hydrogen and (lower) alkyl and alkenyl groups of from 1 to 6 carbon atoms of $R^6$ and $R^7$ may be concatenated together with hydrocarbyl groups to form a naphthyl group. Styrene is the preferred alkenyl aromatic compound.

An α,β-unsaturated cyclic anhydride may be copolymerized with the vinyl aromatic compound. These compounds may be represented by the formula:

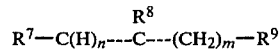

wherein the dotted lines represent a single or double carbon to carbon bond, $R^7$ and $R^8$ taken together represents a

linkage, $R^9$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-carbon double bond, and m is an integer of from 0 to about 10. Amounts from 0 to 1 part per weight of anhydride per part by weight of alkenyl aromatic resin may be used. Examples include maleic anhydride, citraconic anhydride, itaconic anhydride, aconitic anhydride and the like.

The EPDM modified alkenyl aromatic resins that may be utilized in the present invention are described in U.S. Pat. No. 4,101,503; U.S. Pat. No. 4,101,504 and U.S. Pat. No. 4,101,505 which are incorporated by reference. The preferred EPDM modified alkenyl aromatic resin is ethylene propylene 5-ethylidene-2-norbornene modified polystyrene.

The ethylene propylene rubbers may be prepared according to the method described in the Encyclopedia of Polymer Science and Tech. Vol, 6, pages 363-364 and the references cited therein; all of which are hereby incorporated by reference.

The triaryl phosphates may be those having the general formula:

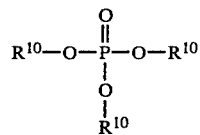

wherein $R^{10}$ is independently phenyl, naphthyl, alkylphenyl, wherein the alkyl group is of 1 to 6 carbon atoms or alkylnaphthyl wherein the alkyl group is of from 1 to 6 carbon atoms. Typical examples include triphenyl phosphate, tri-tolylphosphate, tri-i-propylphosphate or mixed isomers thereof.

The compositions of the invention may comprise from 65 to 95 parts by weight and preferably 70 to 90 parts by weight of a polyphenylene ether resin; from 2-15 parts by weight and preferably from 4-7 parts by weight of an ethylene propylene rubber and from 5-35 parts by weight of a triarylphosphate. The compositions of the invention may also comprise 20 to 80 parts by weight and preferably 30 to 70 parts by weight of a polyphenylene ether resin; from 80 to 20 parts by weight and preferably 70 to 30 parts by weight of an EPDM modified alkenyl aromatic resin; from 2 to 15 parts by weight and preferably 4-7 parts by weight of an ethylene propylene rubber and from 0-15 and preferably 3 to 15 parts by weight of a triarylphosphate.

If desired, reinforcing fillers may be added to the composition in reinforcing amounts such from 1 to 40 parts by weight per 100 parts by weight of total composition of fibrous glass, quartz, metal fibers, wollastonite or the fillers mentioned in U.S. Pat. No. 4,080,351 column 3 and 4, which is incorporated by reference. Flame retardants such as those described in U.S. Pat. No. 3,833,535, which is incorporated by reference, may also be present in addition to non-reinforcing fillers.

The thermoplastic molding compositions may be prepared by tumble blending the components with or without suitable reinforcing agents, stabilizers, pigments, fillers, flame retardants, plasticizers or extrusion aids. The blended components may be extruded and chopped into pellets and the pellets may be molded into any desired shape.

Description of the Preferred Embodiments

EXAMPLE 1

A control composition of 585 g. of poly(2,6-dimethyl-1,4-phenylene) ether[1]; 165 g. parts of triphenylphosphate; 3.8 g. of tridecylphosphite; 1.1 g. of zinc sulfide and 1.1 g. of zinc oxide was extruded in a 28 mm twin-screw extruder and the extruded pellets were molded into standard test pieces in a 3 ounce Newbury screw injection molding machine. Another analogous composition was prepared in the same manner that also included 40 g. of an ethylene propylene rubber copolymer[2].

A second control composition was also prepared using the above described procedure using 425 g. of poly(2,6-dimethyl-1,4-phenylene) ether resin; 75 g. of triphenylphosphate; 2.8 g. of tridecylphosphite; 0.9 g. of zinc sulfide and 0.9 g. of zinc oxide. Another analogous composition was prepared which also included 25 g. of an ethylene propylene rubber copolymer.

The properties of the molded composition are described in Table 1.

TABLE 1

| | PPO:TPP (wt):(ratio) | EPR wt % | Elong (%) | T.Y. (psi) | Izod Imp. (ft.lb/in.n.) | Gardner (in-lbs) | HDT (°F.) | Gloss |
|---|---|---|---|---|---|---|---|---|
| A* | 78:22 | 0 | 87 | 10600 | 0.9 | 325 | 227 | 60 |
| B | 78:22 | 5.3 | 86 | 9400 | 2.9 | 375 | 226 | 62 |
| C* | 85:15 | 0 | 76 | 12100 | 1.5 | 30 | 278 | 37 |
| D | 85:15 | 5.0 | 87 | 11300 | 2.6 | 225 | 275 | 52 |

*Control
1. PPO, General Electric Company IV about 0.47 dl/g in $CHCl_3$ at 30° C.
2. Vistalon 702 (Exxon) a copolymer of ethylene and propylene containing about 75 mol percent ethylene

EXAMPLE 2

A series of compositions were prepared as described in Example 1. Each composition contained 50 parts of the poly(2,6-dimethyl-1,4-phenylene) ether from Example 1.; 50 parts of a particular styrene resin; 3 parts of triphenylphosphate; 1 part of tridecylphosphite; 0.15 parts of zinc sulfide; 0.15 parts of zinc oxide and varying amounts of an ethylene propylene rubber (from Example 1)

TABLE 2

| | Styrene resin | EPR (phr) | Izod Impact (ft. lbs/in. notch) | Gardner Impact (in-lbs) |
|---|---|---|---|---|
| E | homopolystyrene[1] | 0 | 0.6-0.7 | <5 |
| F | " | 2 | 0.7 | 15 |
| G | " | 5 | 1.3 | 15 |
| H | " | 8 | 1.5 | 15 |
| I | EPDM modified styrene resin[2] | 0 | 1.6-1.7 | <5 |
| J | EPDM modified styrene resin[2] | 2 | 1.7 | 15 |
| K | EPDM modified styrene resin[2] | 5 | 2.8 | 15 |
| L | EPDM modified styrene resin[2] | 8 | 2.9 | 10 |
| M | polybutadiene modified styrene resin[3] | 0 | 3.5-4.1 | 250 |
| N | polybutadiene modified styrene resin[3] | 2 | 4.6 | 240 |
| O | polybutadiene modified styrene resin[3] | 5 | 4.7 | 25 |
| P | polybutadiene modified styrene resin[3] | 8 | 3.5 | 10 |

[1] Dylene 8G
[2] Taflite 925
[3] Foster Grant 834

It can be seen that 2 parts per hundred parts (phr) of composition of the ethylene propylene rubber has little or no effect on Izod impact strength of compositions of poly(2,6-dimethyl-1,4-phenylene) ether with styrene homopolymer or with EPDM modified polystyrene. Impact strength is substantially increased by addition of 5 phr of the ethylene propylene rubber but no further substantial improvement was noted when the ethylene propylene rubber content was increased to 8 phr thus revealing the optimum amount of ethylene propylene rubber as being in the 4-7 phr range. The effect of ethylene propylene rubber on polybutadiene modified styrene resin is erratic; 2 phr incresed Izod Impact strength and does not affect the Gardner Impact; 5 phr increases Izod but decreases Gardner Impact; 8 phr decreases both Izod and Gardner.

Obviously many variations will suggest themselves to those skilled in the art from the above detailed description without departing from the scope or spirit of the invention. It is, therefore, to be understood that changes may be made in the particular embodiments of the invention as defined by the appended claims.

We claim:

1. A thermoplastic molding composition which consists essentially of:
   (a) a polyphenylene ether resin;
   (b) an ethylene propylene rubber; and
   (c) a component selected from the group consisting of:
      (i) a triaryl phosphate;
      (ii) an EPDM modified alkenyl aromatic resin; and
      (iii) a combination of (i) and (ii).

2. A thermoplastic molding composition as defined in claim 1 wherein the polyphenylene ether resin has units of the formula:

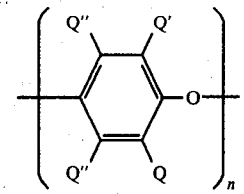

wherein Q is selected from the group consisting of hydrogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, Q' and Q" are the same as Q and in addition halogen with the proviso that Q and Q' are both free of a tertiary carbon atom and n is an integer of at least 50.

3. A thermoplastic molding composition as defined in claim 2 wherein the EPDM modified alkenyl aromatic resin has at least 25% of its units derived from an alkenyl aromatic monomer of the formula:

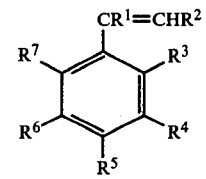

wherein $R^1$ and $R^2$ are selected from the group consisting of hydrogen and lower alkyl or alkenyl groups of from 1 to 6 carbon atoms; $R^3$, $R^4$ and $R^5$ are selected from the group consisting of chloro, bromo, hydrogen and lower alkyl groups of from 1 to 6 carbon atoms; and $R^6$ and $R^7$ may be concatenated with hydrocarbyl groups to form a naphthyl group.

4. A thermoplastic molding composition as defined in claim 3 wherein the alkenyl aromatic monomer is styrene.

5. A thermoplastic molding composition as defined in claim 4 wherein the EPDM rubber is ethylene propylene 5-ethylidene-2-norbornene rubber.

6. A thermoplastic molding composition as defined in claim 5 wherein the polyphenylene ether resin is poly(2,6-dimethyl-1,4-phenylene) ether resin.

7. A thermoplastic molding composition as defined in claim 1 wherein component (c) is triphenyl phosphate.

8. A thermoplastic molding composition which consists essentially of:
   (a) poly(2,6-dimethyl-1,4-phenylene) ether resin;
   (b) an ethylene propylene rubber; and
   (c) a component selected from the group consisting of:
      (i) a triaryl phosphate;
      (ii) an EPDM modified alkenyl aromatic resin;
      (iii) a combination of (i) and (ii).

9. A thermoplastic molding composition as defined in claim 8 wherein component (c) consists of a triaryl phosphate.

10. A thermoplastic molding composition as defined in claim 8 wherein component (c) consists of a triaryl phosphate and an EPDM modified styrene resin.

11. A thermoplastic molding composition as defined in claim 1 which includes a reinforcing amount of a reinforcing filler.

12. A thermoplastic molding composition as defined in claim 1 which includes as a further component a flame retardant amount of a flame retardant agent.

13. A thermoplastic molding composition as defined in claim 11 which includes as a further component a flame retardant amount of a flame retardant.

14. A thermoplastic molding composition as defined in claim 8 wherein component (c) consists of component (ii).

15. A thermoplastic molding composition which consists essentially of:
 (a) from 65 to 95 parts by weight of a polyphenylene ether resin;
 (b) from 4 to 7 parts by weight of an ethylene propylene rubber; and
 (c) a component selected from the group consisting of:
  (i) 5-35 parts by weight of a triaryl phosphate;
  (ii) 80-20 parts by weight of an EPDM modified alkenyl aromatic resin; and
  (iii) a combination of (i) and (ii).

16. A thermoplastic molding composition as defined in claim 15 wherein the triaryl phosphate is triphenyl phosphate.

17. A thermoplastic molding composition as defined in claim 15 wherein (c) is triphenyl phosphate.

18. A thermoplastic molding composition as defined in claim 15 wherein (c) is an EPDM modified alkenyl aromatic resin.

19. A thermoplastic molding composition as defined in claim 15 wherein the polyphenylene ether resin is a poly(2,6-dimethyl-1,4-phenylene) ether.

* * * * *